(12) United States Patent
Matsuo et al.

(10) Patent No.: US 10,118,553 B2
(45) Date of Patent: Nov. 6, 2018

(54) EXCAVATION DEVICE USING STEREO CAMERA AND ANGLE SENSORS TO POSITION BUCKET

(71) Applicant: Hitachi, Ltd., Chiyoda-ku, Tokyo (JP)

(72) Inventors: Shigeru Matsuo, Tokyo (JP); Noriyasu Hasejima, Tokyo (JP); Kenichirou Kurata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 54 days.

(21) Appl. No.: 15/303,937

(22) PCT Filed: Apr. 24, 2014

(86) PCT No.: PCT/JP2014/061353
§ 371 (c)(1),
(2) Date: Oct. 13, 2016

(87) PCT Pub. No.: WO2015/162710
PCT Pub. Date: Oct. 29, 2015

(65) Prior Publication Data
US 2017/0028922 A1    Feb. 2, 2017

(51) Int. Cl.
*G06K 9/00* (2006.01)
*B60R 1/00* (2006.01)
(Continued)

(52) U.S. Cl.
CPC ............... *B60R 1/002* (2013.01); *E02F 9/261* (2013.01); *E02F 9/262* (2013.01); *E02F 9/264* (2013.01);
(Continued)

(58) Field of Classification Search
CPC ............. B60R 1/002; B60R 2300/107; B60R 2300/802; E02F 9/205; E02F 9/261;
(Continued)

(56) References Cited

U.S. PATENT DOCUMENTS

| 2007/0010925 A1 | 1/2007 | Yokoyama et al. | |
| 2008/0005938 A1* | 1/2008 | Aebischer | E02F 9/264 37/413 |
| 2012/0191431 A1 | 7/2012 | Dunbabin et al. | |

FOREIGN PATENT DOCUMENTS

| JP | 2008-241300 A | 10/2008 |
| JP | 2009-42175 A | 2/2009 |

(Continued)

OTHER PUBLICATIONS

International Search Report (PCT/ISA/210) issued in PCT Application No. PCT/JP2014/061353 dated Jun. 10, 2014 with English-language translation (four (4) pages).

*Primary Examiner* — Nirav G Patel
(74) *Attorney, Agent, or Firm* — Crowell & Moring LLP

(57) ABSTRACT

Excavation is performed using an excavation device so that positions of a bucket and of an excavated material are measured with high accuracy. Safe excavation work is realized by having the excavation device include a stereo camera, and by recognizing a bucket from an image photographed by the camera, measuring a position of the bucket, recognizing an excavated material to be separated from the ground from the image photographed by the camera, measuring a position of the excavated material, and measuring a positional relationship between the bucket and the excavated material in the same screen.

6 Claims, 8 Drawing Sheets

(51) Int. Cl.
*H04N 13/204* (2018.01)
*E02F 9/26* (2006.01)
*G06K 9/46* (2006.01)
*H04N 13/02* (2006.01)
*G06T 7/593* (2017.01)
*G01C 11/06* (2006.01)
*H04N 13/00* (2018.01)
*E02F 9/20* (2006.01)

(52) U.S. Cl.
CPC .............. *E02F 9/265* (2013.01); *G01C 11/06* (2013.01); *G06K 9/00791* (2013.01); *G06K 9/4638* (2013.01); *G06T 7/593* (2017.01); *H04N 13/0239* (2013.01); *H04N 13/204* (2018.05); *B60R 2300/107* (2013.01); *B60R 2300/802* (2013.01); *E02F 9/205* (2013.01); *G06T 2207/10012* (2013.01); *G06T 2207/30252* (2013.01); *H04N 2013/0081* (2013.01)

(58) Field of Classification Search
CPC ........... E02F 9/262; E02F 9/264; E02F 9/265; G01C 11/06; G06K 9/00791; G06K 9/4638; G06T 2207/10012; G06T 2207/30252; G06T 7/593; H04N 13/0203; H04N 13/0239; H04N 2013/0081
See application file for complete search history.

(56) References Cited

FOREIGN PATENT DOCUMENTS

| | | |
|---|---|---|
| JP | 2012-233353 A | 11/2012 |
| JP | 2012-255286 A | 12/2012 |
| JP | 2013-36243 A | 2/2013 |
| WO | WO 2005/024144 A1 | 3/2005 |

\* cited by examiner

EXCAVATION DEVICE USING STEREO CAMERA AND ANGLE SENSORS TO POSITION BUCKET

TECHNICAL FIELD

The present invention relates to an excavation device such as a hydraulic shovel in which an excavation operation is automated through external recognition.

BACKGROUND ART

Devices that automatically perform excavation work have been introduced in excavation devices such as a hydraulic shovel and a bulldozer. It is required to perform an operation in which excavation is performed by recognizing positions of a bucket and an excavated material and moving the bucket to the excavated material in order to automatically perform the excavation work. Sensors that measure an angle of the bucket, the amount of stroke, and an angle of an arm or a boom have been developed as a means for measuring the position of the bucket. However, it is difficult to recognize an excavation target material using such sensors. For example, it is difficult to set a position and a shape of an excavated material in the case of excavating coal or iron ore in a mine, and thus, it is necessary to recognize the position and shape in real time at the time of performing work.

Meanwhile, disclosed is a technique in which an excavation device is equipped with a stereo camera to recognize external world. A work amount measurement device, which is disclosed in PTL 1, is configured to photograph a bucket after excavation and after releasing of earth so as to calculate a capacity, and to measure the amount of excavation from each difference of the capacity. In addition, a calibration system of a hydraulic shovel in PTL 2 is configured to photograph a work tool, which is moved to a reference point, using a stereo camera so as to measure a position thereof, and to perform calibration of an angle sensor of a boom or an arm.

CITATION LIST

Patent Literature

PTL 1: Japanese Patent Application Laid-Open No. 2008-241300
PTL 2: Japanese Patent Application Laid-Open No. 2012-233353

SUMMARY OF INVENTION

Technical Problem

According to the above-described PTL 1, an excavated material inside the bucket is recognized by the stereo camera, and an excavation target material before excavation is not recognized. That is, the excavated material is recognized in a limited state of being inside the bucket, and it is difficult to cope with the recognition of the excavation target material before being excavated whose shape and position are unclear in the above-described PTL 1.

According to the above-described PTL 2, a bucket is recognized in order to calibrate the angle sensor that detects the position of the work tool such as the bucket, and it is difficult to recognize an excavated material. In addition, the position of the bucket is measured using the angle sensor.

In addition, excavation work is performed in a mine by disposing a hydraulic shovel on an excavation target material and scooping up an excavated material thereof using a bucket. Accordingly, it is necessary to consider not only a way of increasing the amount of excavation but also a way of preventing the hydraulic shovel on the excavated material from tumbling down, which occurs as the excavated material collapses, in the case of extracting an excavation point in the excavated material.

Solution to Problem

In order to achieve the above-described objects, an excavation device of the present invention is characterized by including: a stereo camera; a means for recognizing a bucket from an image photographed by the camera and measuring a position of the bucket; a means for recognizing an excavated material from the image photographed by the camera and measuring a position of the excavated material; and a means for measuring a positional relationship between the bucket and the excavated material in an identical screen.

Furthermore, the present invention is characterized such that the position of the excavated material is set to a point which exceeds a predetermined length from an upper swing body of the excavation device in the excavation device.

Furthermore, the present invention is characterized such that the means for measuring the position of the excavated material recognizes the excavated material to be separated from a ground from the image photographed by the camera in the excavation device.

Furthermore, the present invention is characterized such that an edge image of the excavated material is created, a boundary between rocks as the excavated material is extracted from the edge image, and a position of the excavated material is selected among points at the boundary in the excavation device.

Furthermore, the present invention is characterized such that position information, which is measured using a sensor other than the stereo camera, is used as the position of the bucket when the bucket is present outside a photographing range of the stereo camera, and position information, which is measured by the stereo camera, is used as the position of the bucket when the bucket is present inside the photographing range of the stereo camera in the excavation device.

Furthermore, the present invention is characterized such that the positional relationship between the bucket and the excavated material, which is measured by the stereo camera, is superimposed on the image photographed by the stereo camera and displayed in the excavation device.

Furthermore, the present invention is characterized such that the positional relationship between the bucket and the excavated material includes any one or both of the position of the excavated material and a length between the bucket and the excavated material in the excavation device.

Advantageous Effects of Invention

According to the present invention, the bucket and the excavated material are measured at the same time using the stereo camera, and thus, it is possible to measure a positional relationship therebetween with high accuracy and to omit calibration of the angle sensor for measurement of the position of the bucket at the time of causing the bucket to approach the excavated material.

In addition, it is possible to recognize an excavated material to be separated from ground and specify an excavation range at the time of extracting an excavation point of the excavated material according to the present invention, and thus, it is possible to obtain a favorable work efficiency and extract a safe excavation point.

DESCRIPTION OF EMBODIMENTS

Hereinafter, embodiments of the present invention will be described with reference to the drawings.

Hereinafter, a first embodiment of the present invention will be described.

Figure 1:
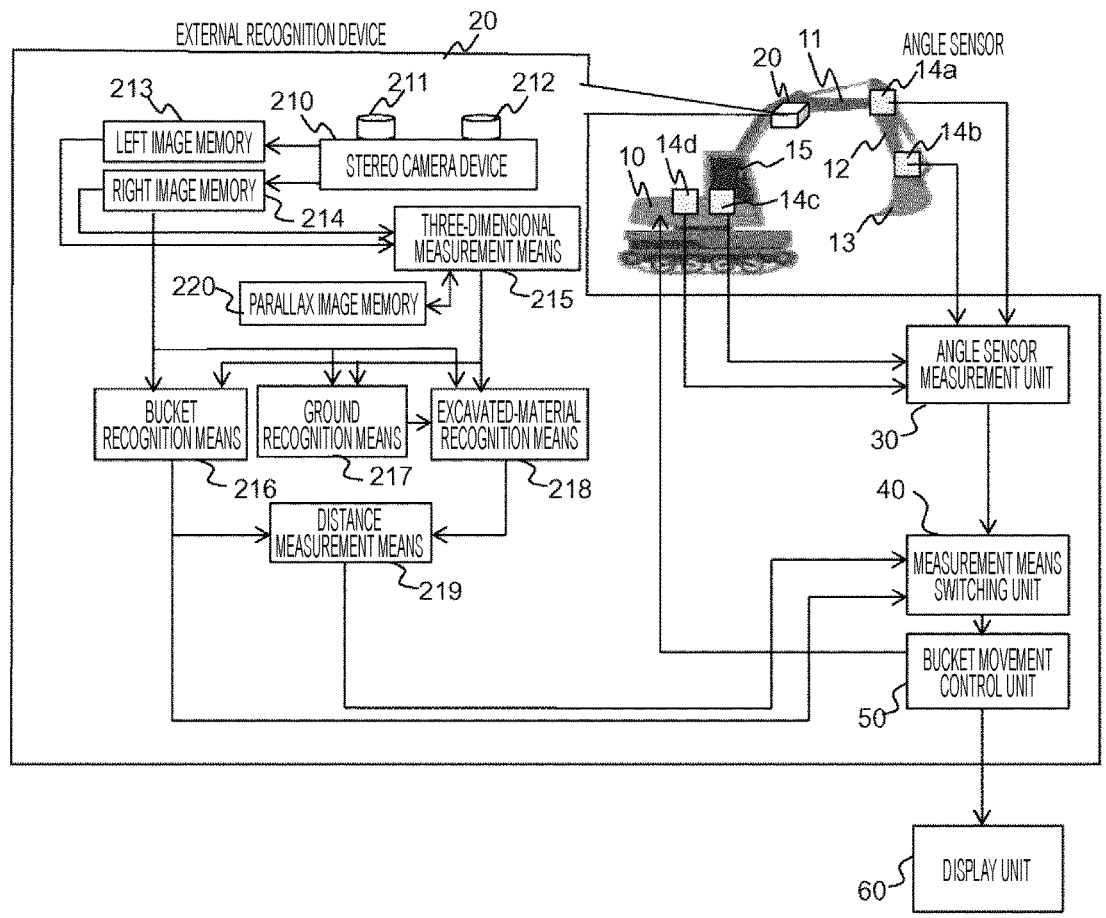
FIG. 1 is a diagram of an embodiment illustrating each configuration of a hydraulic shovel that performs automatic excavation and an external recognition device equipped in the hydraulic shovel according to the present invention.

FIG. 1 illustrates a hydraulic shovel 10 as an automatic excavation device to implement the present invention. The hydraulic shovel 10 recognizes an excavated material, excavates the excavated material, and releases earth to a set location. Thus, the hydraulic shovel 10 is equipped with an external recognition device 20, configured to recognize a periphery thereof, and excavates the excavated material recognized by the external recognition device 20. The vehicle 10 includes a bucket 13 configured to perform excavation, and an arm 12 and a boom 11 configured to vertically move the bucket 13. In addition, it is possible to rotate an upper swing body 15 in order to laterally move the bucket. Furthermore, an arm angle sensor 14a, a bucket angle sensor 14b, a boom angle sensor 14c, and an upper swing body rotation angle sensor 14d are provided to measure a position of the bucket. The hydraulic shovel 10 can know the position of the bucket 13 using these sensors.

However, it is difficult for the hydraulic shovel 10 to know the position of the excavated material with the above configuration; therefore, it is difficult to determine a movement destination of the bucket 13. Thus, the excavated material is determined and the position thereof is measured using the external recognition device 20 which is provided in the boom 11. In addition, it is necessary to perform calibration between sensors in order to enhance the measurement accuracy when the position of the bucket 13 and the position of the excavated material are measured using different sensors. Thus, not only the position of the excavated material but also the position of the bucket 13 is measured at the same time using the external recognition device 20 when the bucket 13 approaches the excavated material. In this manner, it is possible to measure the bucket 13 and the excavated material using one sensor, and it is unnecessary to perform the calibration.

The hydraulic shovel 10 includes an angle sensor measurement unit 30, a measurement means switching unit 40, and a bucket movement control unit 50 in order to control the above-described operations. The angle sensor measurement unit 30 measures the position of the bucket 13 using the arm angle sensor 14a, the bucket angle sensor 14b, the boom angle sensor 14c, and the upper swing body rotation angle sensor 14d. The measurement means switching unit 40 outputs position data of the bucket 13, which is output by the angle sensor measurement unit 30 when the bucket 13 is positioned in a range in which the bucket 13 cannot be measured by the external recognition device 20, and outputs position data of the bucket 13, which is output by the external recognition device 20 when the bucket 13 is positioned in a range in which the bucket 13 can be measured by the external recognition device 20, to the bucket movement control unit 50. The bucket movement control unit 50 moves the bucket 13 to an excavation point on the basis of the position of the bucket 13, a position of the excavation point, and a length therebetween, and performs excavation work. Furthermore, the excavated material inside the bucket 13 is released to a predetermined position after the excavation. For example, a cargo bed of a dump truck is assumed as the releasing position, but is not illustrated since the present embodiment relates to the function of recognizing the excavated material and the bucket 13. In addition, the display unit 60 displays the position of the bucket 13, the excavation point, the excavated material, the movement destination and a movement trajectory of the bucket 13, and the like.

The external recognition device 20 measures the external world using a stereo camera device 210. The stereo camera device 210 can measure a length of a subject using parallax between images photographed by two cameras including a left image photographing unit 211 and a right image photographing unit 212. The images photographed by the stereo camera device 210 are temporarily stored in a left image memory 213 and a right image memory 214 and sent to the three-dimensional measurement means 215. In the three-dimensional measurement means 215, a parallax image is created using right and left images and stored in a parallax image memory 220, and a three-dimensional coordinate of the subject is obtained. A bucket recognition means 216 recognizes the bucket 13 using the right image and the parallax image. A ground recognition means 217 specifies an area of ground on a screen using the right image and the parallax image. An excavated material recognition means 218 recognizes the excavated material using the right image and the parallax image, and further determines a position that needs to be excavated. A length measurement means 219 measures a length between a three-dimensional coordinate of the bucket 13 and a three-dimensional coordinate of the position of the excavated material that needs to be excavated, and outputs the positions thereof and the length therebetween to the measurement means switching unit 40.

Figure 2:
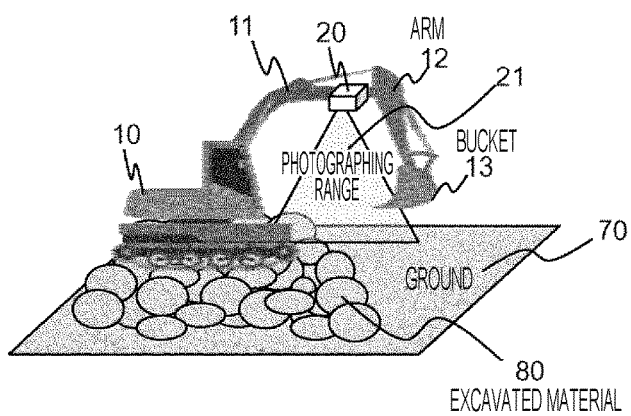
FIG. 2 illustrates an excavation status of the hydraulic shovel.

FIG. 2 illustrates a positional relationship between the hydraulic shovel 10 and an excavated material 80. The excavated material 80 is present on the ground, and the hydraulic shovel 10 is loaded on the excavated material 80. Accordingly, it is necessary to measure a lower side of the hydraulic shovel 10 in order to allow the external recognition device 20 to measure the excavated material 80. Thus, the external recognition device 20 is provided in the boom 11 such that a ground 70 side is photographed in the present embodiment. In addition, there is a risk that the excavated material 80 collapses, and the hydraulic shovel 10 tumbles down from the excavated material 80 depending on a location in which excavation is to be performed sine the hydraulic shovel 10 is loaded on the excavated material 80. Accordingly, it is necessary to extract a point at which the excavated material 80 does not collapse without scraping the ground 70 with the maximum amount of excavation at the time of determining the excavation point.

Figure 3:
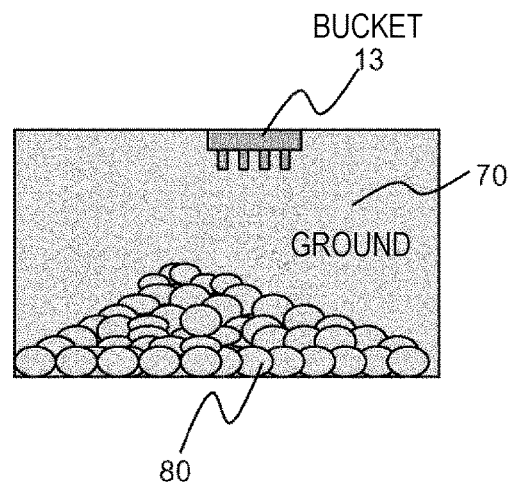
FIG. 3 illustrates an example of an image to be photographed by the external recognition device.

FIG. 3 illustrates an example of an image that is photographed by the external recognition device 20 in the state of FIG. 2. The excavated material 80 is photographed on a lower side of the image, the ground 70 is photographed above the excavated material 80, and the bucket 13 is photographed on the further upper side.

Figure 4:
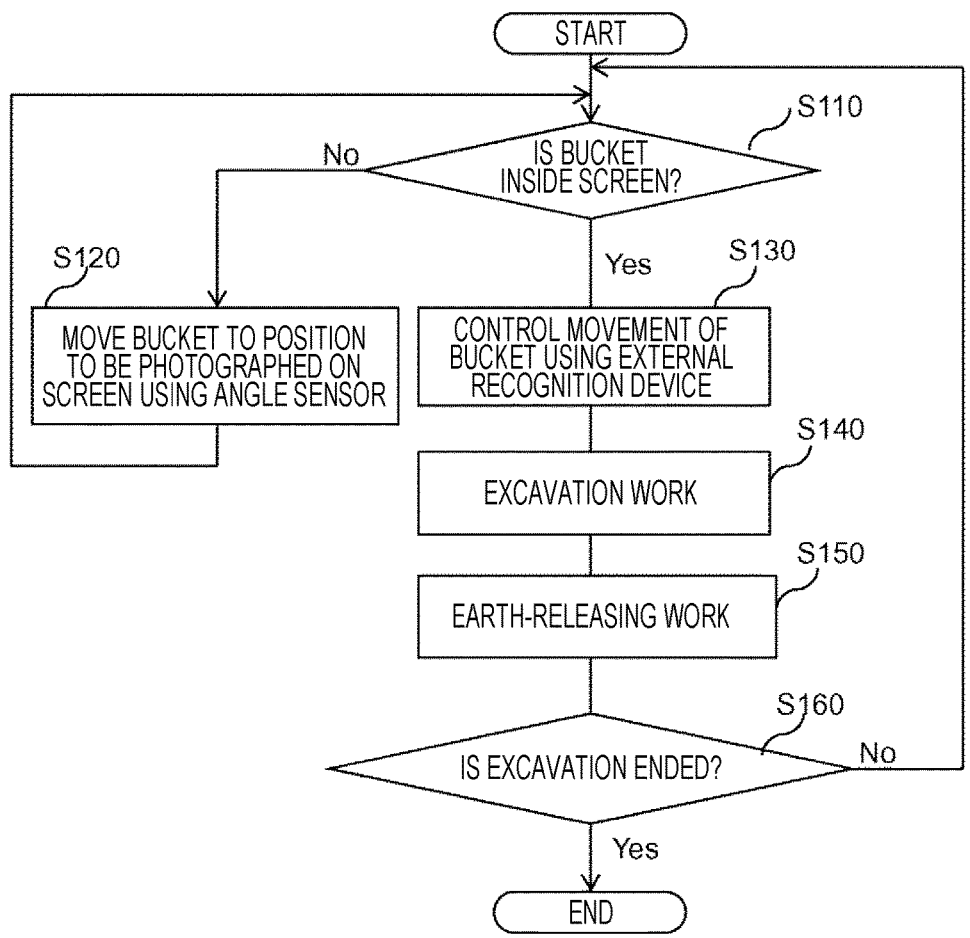
FIG. 4 illustrates a method of switching and controlling a measurement value obtained by an angle sensor and a measurement value obtained by the external recognition device.

FIG. 4 illustrates an operation flow of the bucket movement control unit 50. It is determined whether the bucket 13 is photographed by the stereo camera device 210 (Step 110, hereinafter, will be referred to as S110), and the bucket 13 is moved to a position at which the bucket 13 can be photographed, using the angle sensors (14a, 14b, 14c and 14d), if the bucket 13 is not photographed (S120). When the bucket 13 is moved from the position at which the bucket 13 is not photographed by the stereo camera device 210 to the position at which the bucket 13 is photographed, the bucket 13 may be placed at any point in a photographing range, and thus, the positional accuracy is not necessarily high. Accordingly, the calibration is not necessarily performed. On the contrary, when the bucket 13 is photographed by the stereo camera device 210, the bucket 13 is moved using position measurement data of the bucket 13 and the excavated material 80 which are obtained by the external recognition device 20 (S130). When the bucket 13 reaches the excavation point, the excavation work is performed (S140). Thereafter, the excavated material contained in the bucket 13 is released (S150). The operation is repeated until the excavation ends (S160). The position of the bucket 13 is measured using the angle sensor when the bucket 13 is at a position far from the excavated material 80 in a range in which the bucket 13 is not photographed by the stereo camera device 210, and both the bucket 13 and the excavated material 80 are measured using the external recognition device 20 when the bucket 13 approaches the excavated material 80 and is photographed by the stereo camera device 210 through the above-described operation, and thus, it is possible to omit the calibration between the angle sensor and the external recognition device 20. In addition, when the excavated material 80 and the bucket 13 approach each other, the both are measured by the external recognition device 20, and thus, it is possible to enhance the measurement accuracy.

Figure 5:
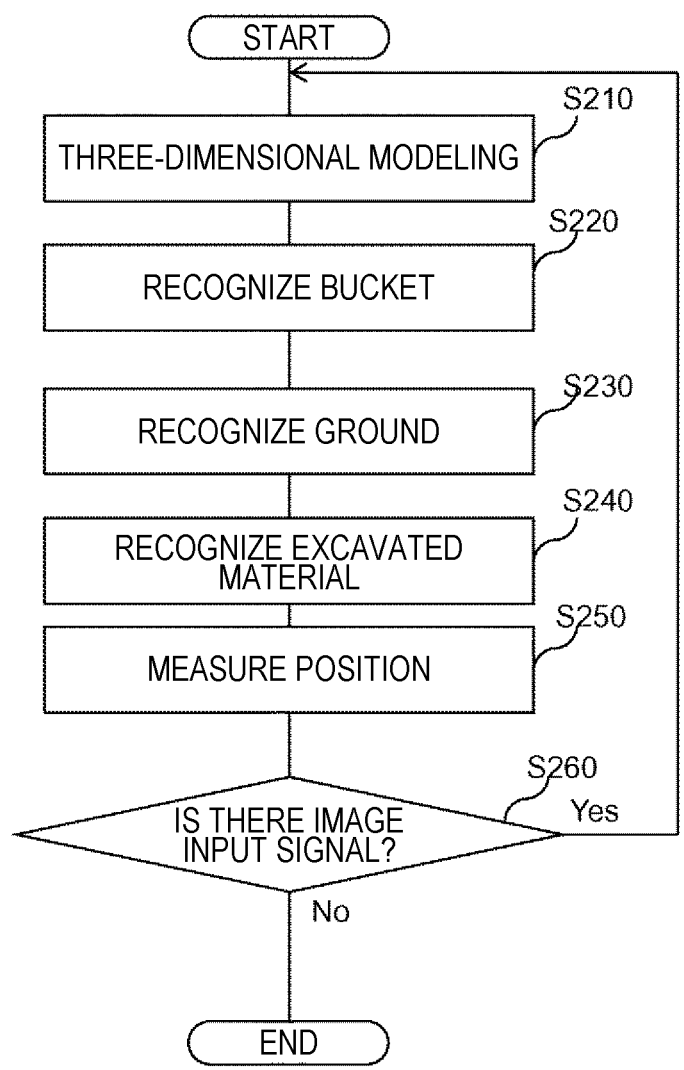
FIG. 5 illustrates a method of processing excavation work using the external recognition device.

FIG. 5 illustrates an operation flow of the external recognition device 20. First, an image is photographed by the stereo camera device 210, and three-dimensional modeling of a subject is performed using the image (S210). A detailed processing flow of this three-dimensional modeling process will be illustrated in FIG. 6 to be described later. Next, a bucket recognition process is performed using a result of the three-dimensional modeling and the photographed image (S220). This process will be described in detail in FIG. 9 to be described later. Next, recognition of the ground 70 is performed (S230), and further, recognition of the excavated material 80 is performed, thereby determining an excavation point (S240). These processes will be described in detail in FIG. 10 to be described later. Finally, a length between a shovel 13 and the excavation point and each coordinate thereof are measured and output to the bucket movement control unit 50 (S250). The above processes are repeated for a period in which there is an image input signal (S260).

Figure 6:
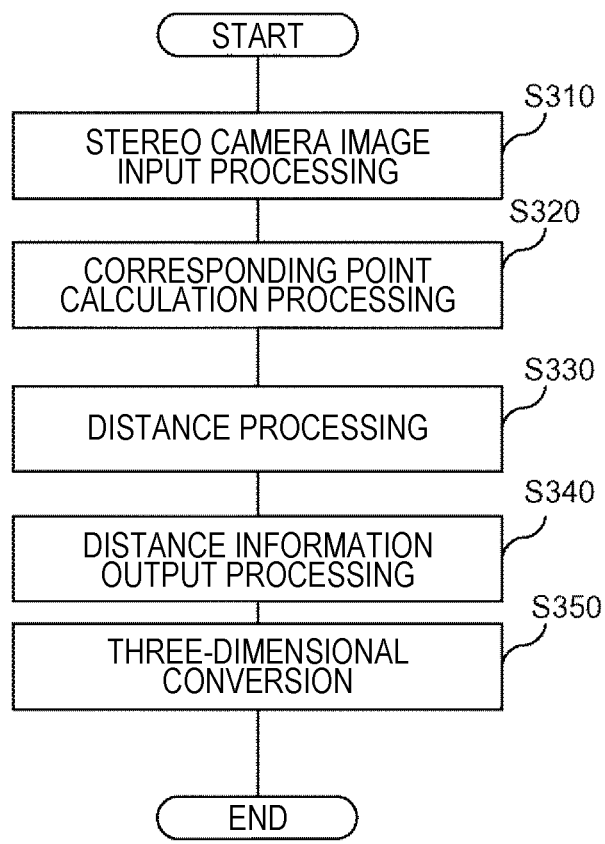
FIG. 6 illustrates a three-dimensional modeling process according to the external recognition device.

FIG. 6 illustrates a processing flow of the three-dimensional modeling. First, images are photographed by the right photographing unit 212 and the left photographing unit 211 of the stereo camera device 210. These photographed images are temporarily stored in the right image memory 214 and the left image memory 213. These image data are first used to create parallax data in the three-dimensional measurement means 215.

Figure 7:
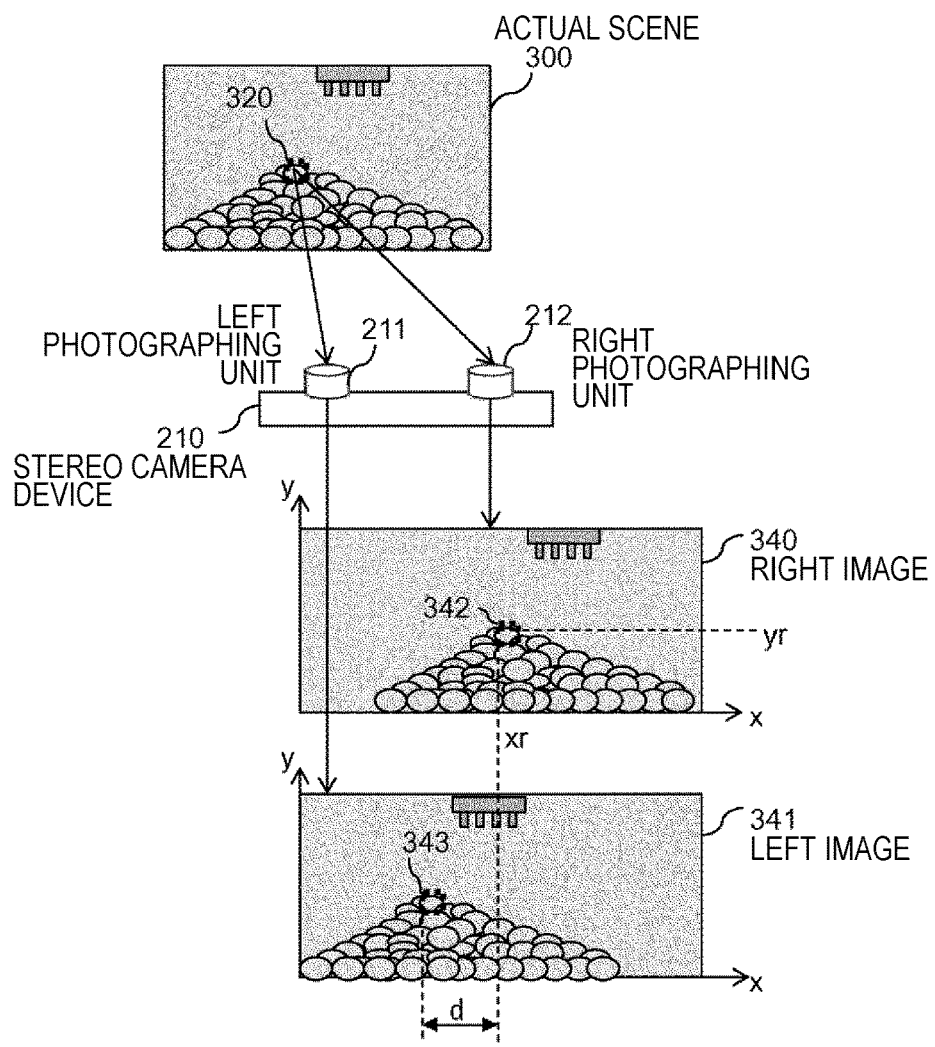
FIG. 7 illustrates a method of calculating parallax data according to a stereo camera device.

FIG. 7 illustrates a principle of the parallax data creation. When there are a right image 340 obtained by photographing an actual scene 300 using the right photographing unit 212 and a left image 341 obtained by photographing the actual scene 300 using the left photographing unit 211, a point 320 in the actual scene 300 is photographed at a position of a point 342 in the right image 340, and is photographed at a position of a point 343 in the left image 341. As a result, a parallax d is generated between the points 342 and 343. This parallax is generated as a large value when the actual scene 300 is close to the stereo camera device 210 or as a small value when the actual scene 300 is far from the stereo camera device 210. The parallax, obtained as above, is obtained for all images, and results thereof are stored in the parallax image memory 220.

Figure 8:
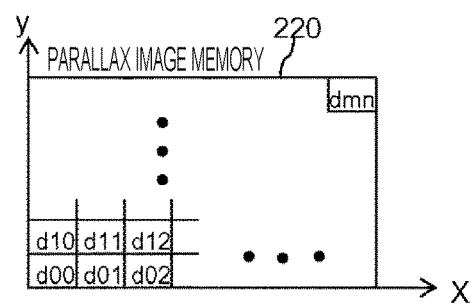
FIG. 8 is a diagram illustrating an example of a parallax image memory.

FIG. 8 illustrates data example of the parallax image memory 220. It is possible to easily allow positions of X and Y indicated by the parallax data and X and Y of the right image to correspond to each other by disposing the parallax data on a two-dimensional space in accordance with the right image. In addition, it is possible to measure a length according to the triangulation principle using the parallax. A length Z is obtained from the parallax d using the following formula.

$$Z=(f \times B)/d \quad \text{Formula (1)}$$

Meanwhile, f represents a focal length of right and left photographing units, and B represents a length between the right photographing unit 212 and the left photographing unit 211. In addition, positions of X and Y on the three-dimensional space of the point at which the above-described length Z is obtained is obtained using the following formula.

$$X=(Z \times xr)/f \quad \text{Formula (2)}$$

$$Y=(Z \times yr)/f \quad \text{Formula (3)}$$

Meanwhile, xr represents a coordinate x on the right image 340, and yr represents a coordinate y on the right image 340. As above, it is possible to obtain a position (X, Y, Z) of a subject on the three-dimensional space using the image photographed by the stereo camera device 210.

Figure 9:
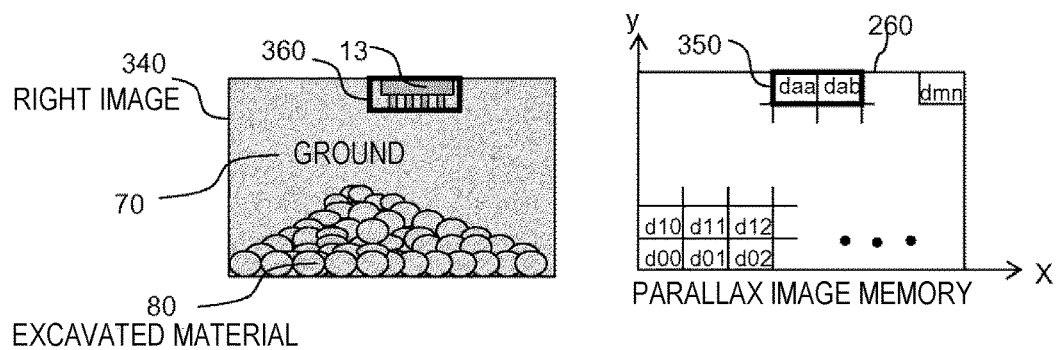
FIG. 9 is a diagram describing a method of recognizing a bucket.

Next, the process of recognizing the bucket 13 will be described with reference to FIG. 9. The parallax data is stored in the parallax image memory 260 such that the right image 340 and the coordinates X, Y correspond to each other. The bucket 13 is positioned to be closer to the stereo camera device 210 than the ground 70 according to the positional relationship between the bucket 13 and the ground 70 in FIG. 2, and thus, parallax data of the position of the bucket 13 is a larger numeric value than parallax data of the ground 70 in the parallax image memory 260. Accordingly, a part at which the coordinate y of the parallax image memory 260 is large and the parallax data is larger than those of the surrounding parts (for example, a position of data 350) is set as a candidate of the bucket 13. Next, an image 360 having the same coordinates x, y on the right image 340 is extracted using the coordinates x, y of the position of the data 350. When the image 360 and the image of the bucket 13 are compared and characteristics match therebetween, it is possible to calculate a three-dimensional coordinate of the bucket 13 (using the position of the data 350 of the parallax data thereof). As above, when the candidate of the position of the bucket 13 is found first using the parallax data and the characteristics of the image at the position are compared with the bucket 13, it is possible to speed up the recognition of the bucket 13 as compared to the case of searching the bucket 13 from the entire right image 340.

Figure 10:
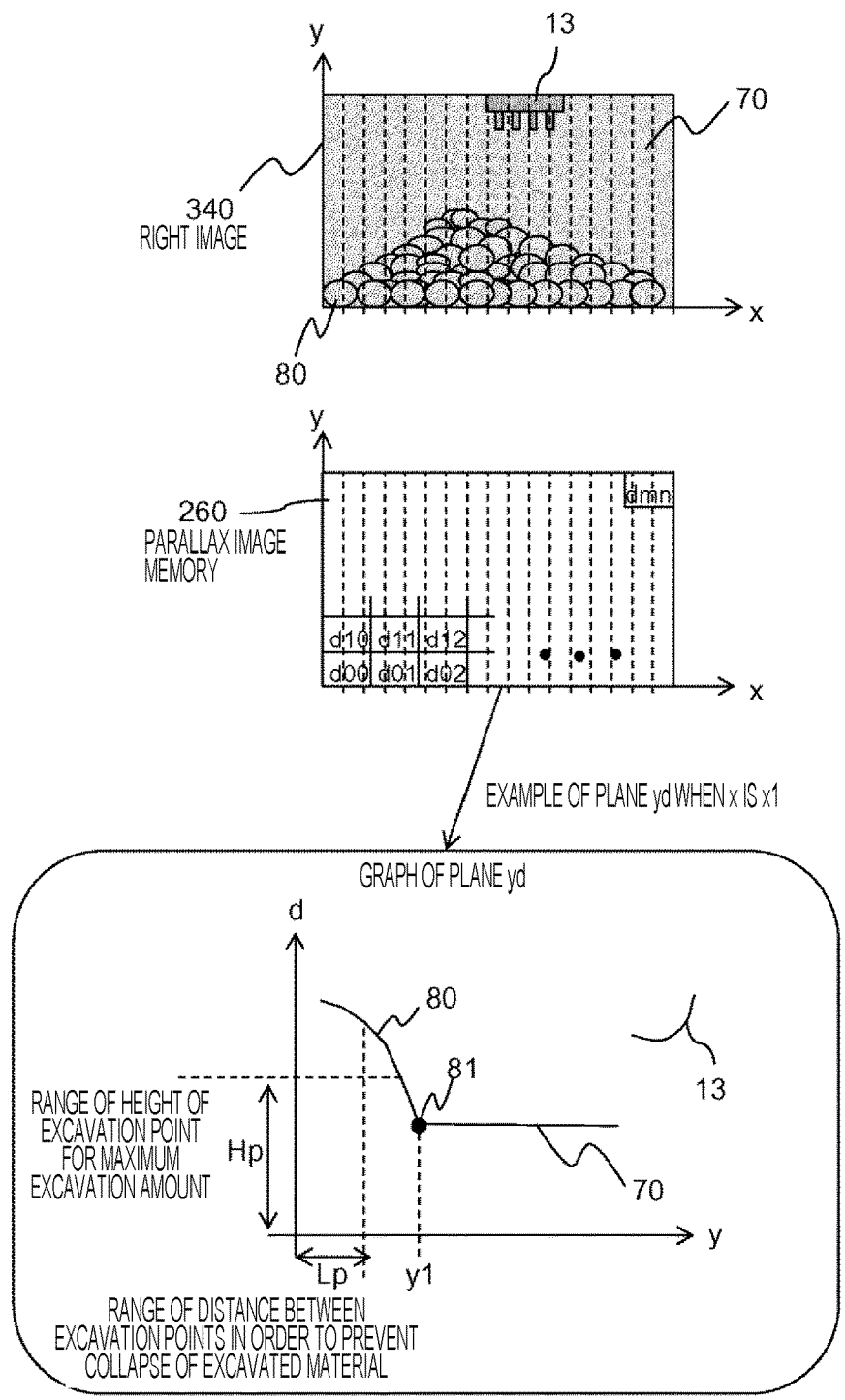
FIG. 10 is a diagram describing a method of recognizing ground and an excavation point.

FIG. 10 describes a process of recognizing the ground 70 and extracting an excavation point from the excavated material 80. The horizontal axis of a graph in FIG. 10 indicates the y-axis direction of the parallax image memory 260 and the vertical direction indicates the parallax value d. That is, the x-axis direction of the parallax image memory 260 is finely divided into strip shapes and a divided strip thereof is expressed in a plane yd. According to the example of the right image 340, the ground 70 and the bucket 13 are photographed on the upper side (side on which y is larger) of the screen, and the excavated material 80 is photographed on the lower side (side on which y is smaller) of the screen. The value d in this state is provided such that the ground 70 has the smallest d (that is, is far away), and each of the bucket 13 and the excavated material 80 has a larger d than the ground 70 (that is, is close).

In addition, if the ground is assumed to be a flat portion with a little undulation, the value d of the ground is the smallest and constant as in the graph on the plane yd. It is possible to specify the ground 70 on the plane yd using such characteristics. In addition, it is possible to define the excavated material 80 as a portion which is on the lower side (side on which y is smaller) of the screen and has the larger value d than the ground 70.

Next, an excavation point is determined in the excavated material 80. The excavation point is a position at which the bucket 13 is brought into contact with the excavated material 80 for the first time during an excavation operation, and the excavation is performed by scooping up the bucket 13 from this position. It is necessary to extract a point at which the excavated material 80 does not collapse without scraping the ground 70 with the maximum amount of excavation as the excavation point. The excavation point is extracted from an excavated material, which is present exceeding a predetermined length range Lp from an upper rotary body 15, in order to satisfy such conditions. The above-described predetermined range is set in advance as a range at which the excavated material does not collapse. In addition, a position, which is higher than the ground, is set in order to prevent the ground from being excavated, and the position is set within a predetermined height Hp from the ground in order to increase the amount of excavation. A part that is at a boundary between the ground 70 and the excavated material 80 and is the farthest is extracted as an excavation point 81 in the present embodiment. This point 81 is a point which is set to have the largest y1 on the entire image by obtaining y1 for each strip, acquired by finely dividing the x-axis of the parallax image memory 260. The three-dimensional coordinate of the excavation point 81 is determined in this process, and it is also possible to calculate a length from the three-dimensional coordinate of the bucket 13.

Figure 11:
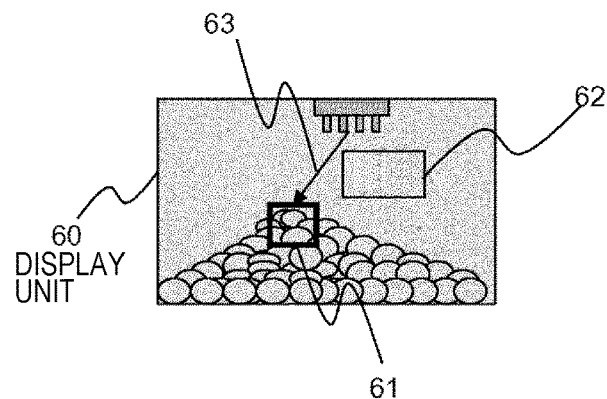
FIG. 11 is a diagram illustrating a display example of a display unit.

Next, FIG. 11 illustrates a display example of the display unit 60. There is a possibility that an operator is on board even in the case of automatic excavation in the embodiment, and thus, it is configured such that a state of excavation can be presented to the operator using the display unit 60. The display unit 60 displays a sign 61 representing the excavation point 81, a length 62 between the bucket 13 and the excavation point 81, and a trajectory 63 of expected movement of the bucket 13, and the like in a superimposed manner on the image of the right image 340. In addition, it is also possible to transmit a display content of the display unit 60, in a wireless or wired manner, to the display unit 60 that is provided outside the hydraulic shovel 10 and is configured to remotely investigate the hydraulic shovel 10 in the case of performing remote control (not illustrated).

Next, a second embodiment of the present invention will be described.

Figure 12:
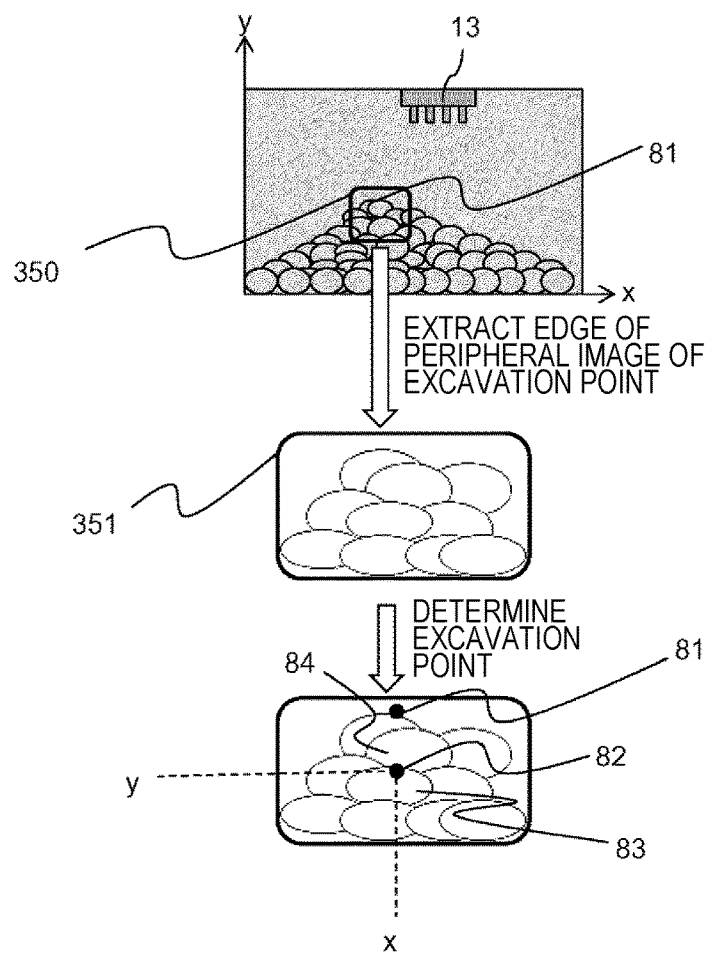
FIG. 12 is a diagram illustrating an example in which the excavation point is set to a boundary of rock.

FIG. 12 illustrates a method of extracting an excavation point according to the second embodiment of the present invention. When excavated materials are large rocks, the excavation point 81 is selected to be a clearance between a rock and a rock in order to prevent breakage of a blade tip of the bucket 13. The excavation point 81 is selected as the boundary point with the ground 70 assuming the flat ground 70. Accordingly, an error occurs in the excavation point 81 when the ground 70 has unevenness. In such a case, there is a risk that the blade tip of the bucket 13 abuts against a central portion of the rock. A method of handling such a case is given as follows. First, a peripheral image 350 of the excavation point 81, extracted in FIG. 10, is taken out. Next, an edge image 351 of the taken-out image 350 is created. Thereafter, a rock 84 at a position, which is separated from the ground 70 farther than the excavation point 81 extracted according to the method illustrated in FIG. 10, is selected in the edge image 351. The value d of the rock 84 is read out from the parallax image memory 260. Next, a rock 83, which is immediately below the rock 84, is extracted and a coordinate x of a point of the rock 83 at which a coordinate y is the largest is obtained. These values (x, y, d) are assigned to the above-described respective formulas, and a point specified by the coordinates (X, Y, Z) is selected as the excavation point 82. Accordingly, it is possible to prevent the breakage of the blade tip of the bucket 13.

When the stereo camera device 210 is used as the external recognition device 20 of the hydraulic shovel 10 that performs the automatic excavation as in the present embodiments described above, it is possible to specify the excavation point 81 which is safe while increasing the amount of excavation, and to measure each three-dimensional coordinate of the bucket 13 and the excavation point 81 and the length between the bucket 13 and the excavation point 81 with high accuracy.

REFERENCE SIGNS LIST 10 hydraulic shovel
11 boom
12 arm
13 bucket
14a arm angle sensor
14b bucket angle sensor
14c boom angle sensor
14d upper swing body rotation angle sensor
15 upper swing body
20 external recognition device
30 angle sensor measurement unit
40 measurement means switching unit
50 bucket movement control unit
60 display unit 70 ground
80 excavated material
81 excavation point
210 stereo camera device
215 three-dimensional measurement means
216 bucket recognition means
217 ground recognition means
218 excavated material recognition means
219 distance measurement means
220 parallax image memory

The invention claimed is:

1. An excavation device comprising:
an upper swing body supported by a base,
a boom interconnected with the upper swing body,
a bucket configured to perform excavation,
an arm interconnecting the bucket and the boom such that the bucket is vertically movable by the arm and the boom,
angle sensors to measure a position of the bucket, and
an external recognition device located between the arm and the upper swing body, the external recognition device including:
a stereo camera;
a means for recognizing the bucket from an image photographed by the stereo camera and measuring a position of the bucket;
a means for recognizing an excavated material from the image photographed by the stereo camera and measuring a position of the excavated material;
a means for measuring a positional relationship between the bucket and the excavated material in an identical screen; and
an angle sensor measurement unit receiving input from the angle sensors, wherein
when the bucket is present outside the photographing range of the stereo camera, position information measured using a sensor other than the stereo camera is used as the position of the bucket, and the bucket is moved using the input from the angle sensors to a position at which the bucket can be photographed, and
when the bucket is present inside the photographing range of the stereo camera, position information measured by the stereo camera is used as the position of the bucket, and the bucket is moved using the input from the angle sensors.

2. The excavation device according to claim 1, wherein the position of the excavated material is set to a point which exceeds a predetermined length from the upper swing body of the excavation device.

3. The excavation device according to claim 1, wherein the means for measuring the positional relationship between the bucket and the excavated material recognizes the excavated material to be separated from a ground from the image photographed by the stereo camera.

4. The excavation device according to claim 1, wherein an edge image of the excavated material is created, a boundary between rocks as the excavated material is extracted from the edge image, and the position of the excavated material is selected among points at the boundary.

5. The excavation device according to claim 1, wherein the positional relationship between the bucket and the excavated material, which is measured by the stereo camera, is superimposed on the image photographed by the stereo camera and displayed.

6. The excavation device according to claim 1, wherein the positional relationship between the bucket and the excavated material includes any one or both of the position of the excavated material and a length between the bucket and the excavated material.

* * * * *